United States Patent [19]

Fender

[11] Patent Number: 4,670,955

[45] Date of Patent: Jun. 9, 1987

[54] METHOD OF ASSEMBLING A MUSICAL INSTRUMENT NECK

[76] Inventor: C. Leo Fender, 1510 Dana Pl., Fullerton, Calif. 92635

[21] Appl. No.: 710,493

[22] Filed: Mar. 11, 1985

Related U.S. Application Data

[62] Division of Ser. No. 457,908, Jan. 14, 1983, Pat. No. 4,528,886.

[51] Int. Cl.[4] .............................................. G01D 1/08

[52] U.S. Cl. .................................................. 29/169.5

[58] Field of Search .................. 29/169.5; 84/293 TR; 156/257

[56] References Cited

U.S. PATENT DOCUMENTS

| | | | |
|---|---|---|---|
| 4,074,606 | 2/1978 | Fender | 84/293 TR |
| 4,237,944 | 12/1980 | Todd, III et al. | 84/293 TR |
| 4,443,074 | 4/1984 | Giacomelli | 156/257 |

*Primary Examiner*—Percy W. Echols
*Attorney, Agent, or Firm*—Spensley Horn Jubas & Lubitz

[57] ABSTRACT

A musical instrument neck formed from first and second elongate neck blanks, each having an inner face, the inner faces being fastened together. An elongate arcuate groove extends along the inner face of the first neck blank only. Coaxial holes are formed in the inner faces of the neck blanks, the hole in the first neck blank being aligned with and perpendicular to one end of the groove. An elongate truss rod is positioned in the groove and an anchor pin is connected to one end of the truss rod, perpendicular thereto, the pin extending into the first and second holes in the neck blanks so as to simultaneously anchor one end of the truss rod and align the first and second neck blanks during a gluing operation.

4 Claims, 4 Drawing Figures

METHOD OF ASSEMBLING A MUSICAL INSTRUMENT NECK

This is a division of application Ser. No. 457,908, filed on Jan. 14, 1983, now U.S. Pat. No. 4,528,886.

BACKGROUND OF THE INVENTION

1. Field of the Invention

The present invention relates to a guitar neck and a method of manufacturing same and, more particularly, to a guitar neck incorporating a truss rod for adjusting the curvature of such neck.

2. Description of the Prior Art

In musical instruments of the type including a body and a neck, such as a guitar, banjo, mandolin, violin and the like, where the instrument neck is made from wood, the neck is subject to warpage from all of the factors which usually cause such phenomenon. Since it is highly important in such an instrument for the fret board to maintain its optimum playing condition, it has become a common practice to provide certain of such instruments with means for adjusting the curvature of the neck to compensate for such warpage.

One of the more common types of adjusting means includes a truss rod assembly positionable in the neck of the musical instrument. A common truss rod assembly is positionable within a slot in the side of the neck opposite from the fret board and includes an elongate truss rod, a fixed anchor nut at one end of the truss rod, and a tension nut at the other end of the truss rod. In operation, rotation of the tension nut moves the other end of the truss rod relative to the tension nut, increasing or decreasing the tension on the truss rod and simultaneously adjusting the curvature of the instrument neck.

The truss rod is an elongate, cylindrical member having a linear axis before being inserted into the slot in the instrument neck, but the slot is curved so that the opposite ends of the truss rod are positioned adjacent the fret board and the center of the truss rod is positioned adjacent the opposite side of the instrument neck. The truss rod assembly is inserted into the slot in the instrument neck and the slot is filled with an elongate fill strip which is made from wood and has the configuration of the slot in the instrument neck after the truss rod assembly is inserted thereinto. The sides of the slot and the fill strip are coated with glue and the fill strip is pressed into the slot. A musical instrument neck having such a truss rod assembly is described in U.S. Pat. No. 4,074,606.

A number of problems have been encountered in use of truss rod assemblies of the above type. First of all, because of the curvature of the slot in the instrument neck and the thickness of the truss rod, the central portion of the fill strip is normally very thin, which creates the possibility of it cracking in handling and failure in use of the instrument. In addition, because of the unevenness of the thickness of the fill strip, the glue, which is used to hold same in the slot, shrinks unevenly. After the fill strip is inserted and the glue dries, the outside surface of the fill strip typically does not align itself exactly with the outside surface of the neck. This necessitates additional finishing and polishing operations which are labor intensive and costly.

In U.S. Pat. No. 4,237,944, to Todd, III et al, a solution to this problem is proposed, which solution consists of forming the neck of a guitar from two similarly shaped blanks of stock material and routing a center portion complementarily formed to accommodate a truss rod. Each element of stock material is routed to provide a mirror image of each other and a separate dowel hole is drilled in each blank to provide further support for the two halves of stock material when they are joined together, as by gluing. The truss rod is preferably J-shaped and is placed in one of the grooves before the blanks are placed together. Subsequent carving of the blanks forms a guitar neck.

While the method of Todd, III et al eliminates the problems associated with the use of fill strips in musical instrument necks, other problems are introduced. By placing a groove on each of the inner faces of each blank in a complementary, associated relationship, two separate and different routing operations are required. A separate locator pin, and holes therefore, is also required. Furthermore, when the two neck blanks are glued together, the plane of the glue joint bisects the truss rod so that the truss rod force operates directly in the plane of the glue joint, which can cause deterioration of same and separation of the neck blanks.

SUMMARY OF THE INVENTION

According to the present invention, these problems are solved by the provision of a new design for the neck of a musical instrument and a new method of forming same. With the present invention, only a single routing operation is required, thereby minimizing the equipment required and labor costs. A single pin functions to anchor the truss rod and align a pair of neck blanks. The pin is also rotatable so that it exactly lines up with the direction of tension in the truss rod. Furthermore, the truss rod is entirely embedded in a single neck blank and the force of the truss rod is not aligned with the glue joint between adjacent neck blanks.

Briefly, the present musical instrument neck comprises first and second elongate neck blanks, each having an inner face, the inner faces being fastened together, an elongate arcuate groove extending along the inner face of the first neck blank only, a first hole in the inner face of the first neck blank, the first hole being aligned with and perpendicular to one end of the groove, a second hole in the inner face of the second neck blank, the second hole being coaxial with the first hole, an elongate truss rod positioned in the groove, and an anchor pin connected to one end of the truss rod, perpendicular thereto, the pin extending into the first and second holes in the first and second neck blanks, respectively, so as to simultaneously anchor one end of the truss rod and align the first and second neck blanks during the gluing operation.

The method of assembling a guitar neck of the above type comprises providing a pair of uncarved blanks from which a guitar neck is to be carved, such blanks typically being unsymmetrical, the blanks each having an inner face thereon, routing a groove in the first neck blank only, drilling a first hole in the inner face of the first neck blank, perpendicular to and in alignment with one end of the groove, drilling a second hole in the inner face of the second neck blank, connecting an anchor pin to one end of the truss rod, perpendicular thereto, disposing a truss rod in the groove in the first neck blank with the pin extending into the first hole therein, fastening together the inner faces of the first and second neck blanks with the anchor pin extending into the second hole in the inner face of the second neck blank, and carving the assembly to the configuration of a guitar neck.

OBJECTS, FEATURES AND ADVANTAGES

It is therefore the object of the present invention to solve the problems encountered heretofore in providing musical instrument necks with truss rod assemblies. It is a feature of the present invention to solve these problems by forming a musical instrument neck out of two neck blanks, routing a groove in one of the neck blanks only and placing a truss rod in such groove. An advantage to be derived is the complete elimination of the elongate fill strips associated with musical instrument necks formed by providing a slot in an instrument neck opposite from the fret board. Another advantage is the complete elimination of the problems associated with forming the neck of a guitar according to the method of Todd, III et al. That is, an advantage of the present invention is that only a single routing operation is required. Still another advantage is that a single pin operates as a rotatable anchor pin and locator pin. Still another advantage is a truss rod assembly wherein the tension is not applied across the plane of the glue joint.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figures 1, 2, 3, 4:
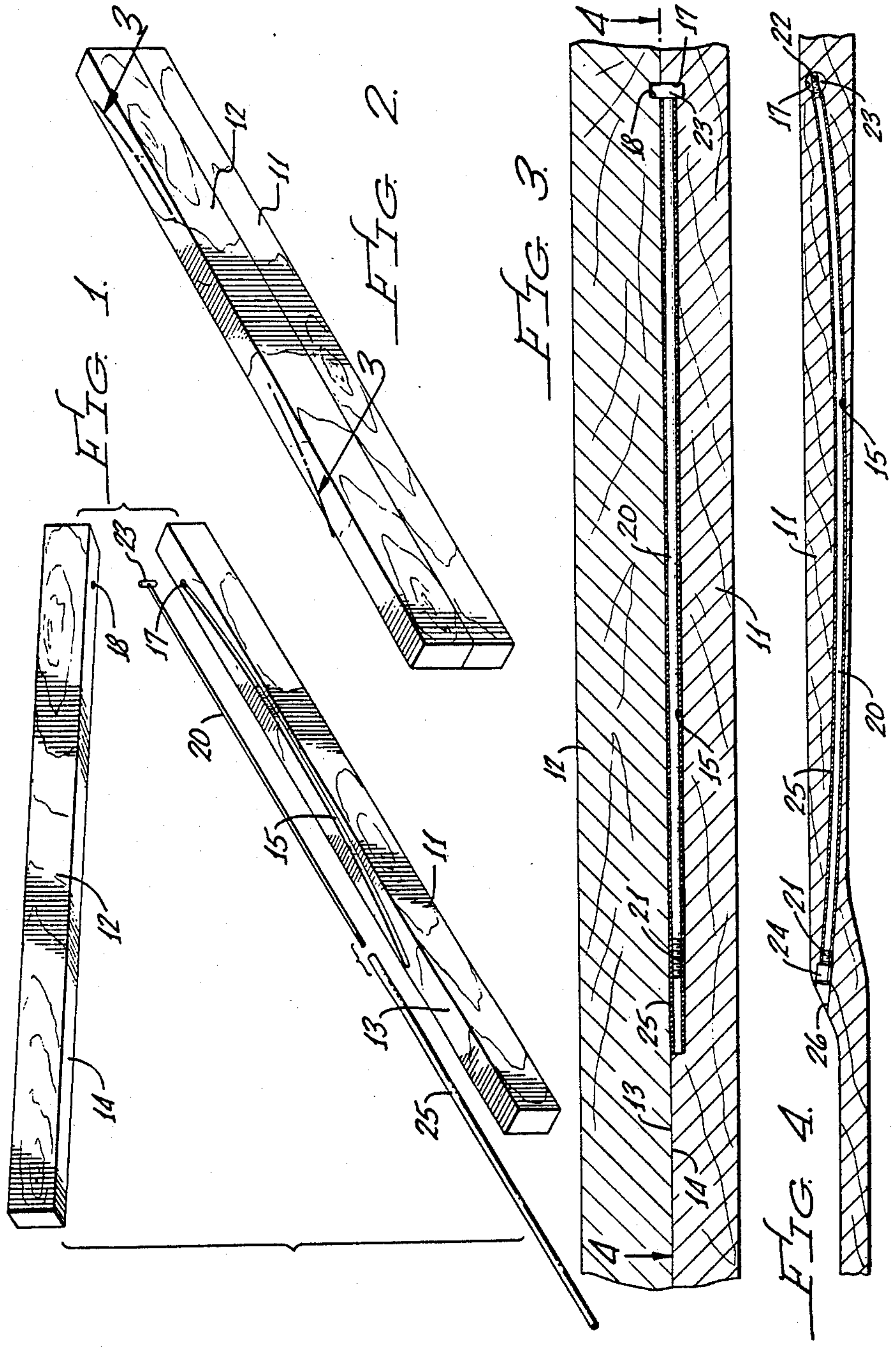
FIG. 1 is an exploded perspective view of the elements used in constructing a musical instrument neck according to the teachings of the present invention.
FIG. 2 is a perspective view showing the elements of FIG. 1 in an assembled state.
FIG. 3 is a longitudinal sectional view taken along the line 3—3 of FIG. 2 along a plane extending through the axis of the truss rod.
FIG. 4;is a longitudinal sectional view taken along the line 4—4 of FIG. 3 after some of the initial carving operations in forming the assembly into an instrument neck.

Referring now to the drawings and, more particularly, to FIG. 1 thereof, there is shown the elements necessary for the manufacture of a guitar neck in accordance with the present invention. More specifically, there is shown first and second neck blanks 11 and 12 which are each high quality, generally rectangular, elongate lengths of solid hardwood, such as maple. Neck blanks 11 and 12 have inner faces 13 and 14 which are adapted to be fastened together with a suitable glue. Glues are presently available such that when inner faces 13 and 14 of neck blanks 11 and 12, respectively, are fastened together, the connection is, for all practical purposes, permanent.

According to the present invention, an elongate, arcuate groove 15 extends along inner face 13 of neck blank 11 only. A first hole 17 extends into neck blank 11, through inner face 13 thereof, hole 17 being aligned with and perpendicular to one end of groove 15. A second hole 18 extends into neck blank 12, perpendicular and through inner face 14 thereof. Hole 18 is positioned so that it is coaxial with hole 17 when inner faces 13 and 14 of neck blanks 11 and 12, respectively, are glued together.

The present musical instrument neck also includes an elongate truss rod 20 of generally conventional configuration. That is, truss rod 20 is an elongate, cylindrical, metal rod which is threaded at opposite ends thereof, at 21 and 22. Threads 22 are adapted to extend into an internally threaded lateral hole in a pin 23, the length of which is equal to the combined depths of holes 17 and 18 and the diameter of which is approximately equal to the diameter of holes 17 and 18. Threaded end 21 of truss rod 20 is adapted to engage a tension nut 24, as will be explained more fully hereinafter.

The present musical instrument neck preferably includes a straw 25, an elongate, thin-walled, sleeve-like member having an inner diameter approximately equal to the outer diameter of truss rod 20 and a length greater than the length of rod 20. The length of straw 25 is approximately equal to the length of groove 15 whereas the length of truss rod 20 is somewhat smaller.

With the above construction, assembling a guitar neck proceeds in a simple and efficient manner. After uncarved blanks 11 and 12 are provided, groove 15 in neck blank 11 is routed and holes 17 and 18 are drilled in neck blanks 11 and 12, respectively. Anchor pin 23 is connected to truss rod 20 and straw 25 is slipped over the entire length of truss rod 20. Truss rod 20 may now be disposed within groove 15, with anchor pin 23 extending into hole 17. The depth of groove 15 is adjusted relative to the diameter of straw 25 so that when so disposed, inner face 13 of neck blank 11 is tangent to the outer surface of straw 25.

Glue can now be readily applied to inner face 14 of neck blank 12 with a roller. Since inner face 14 is an entirely smooth face with nothing protruding therefrom, the glue application step proceeds simply and uniformly. Faces 13 and 14 are then brought together, with anchor pin 23 extending into hole 18. It is therefore apparent that anchor pin 23 serves the dual purpose of functioning as an anchor pin and functioning as a locator pin to align neck blanks 11 and 12. After neck blanks 11 and 12 are so aligned, it is simply necessary to rotate them relative to each other so that the opposed outer surfaces are coplanar. The assembled position of neck blanks 11 and 12 is as shown in FIG. 2.

Once the glue dries, a guitar neck can be readily formed by carving neck blanks 11 and 12. The appearance of neck blanks 11 and 12 after several steps of the carving operation is shown in FIG. 4. It is seen that during the carving operation, the end of groove 15 adjacent threaded end 21 of truss rod 20 is exposed and an increased diameter portion 26 is formed . so as to form a shoulder against which tension nut 24 may rest when connected to threaded end 21 of truss rod 20.

Straw 25 represents a-conventional technique for preventing the glue from contacting and attacking truss rod 20. In this manner, truss rod 20 remains freely movable within groove 15 after neck blanks 11 and 12 are secured together.

With such a construction, a number of advantages are achieved. Initially, only a single routing operation is required, thereby minimizing the equipment required and labor costs. A single anchor pin 23 functions to anchor truss rod 20 and to align neck blanks 11 and 12. It should be particularly noted that pin 23 is rotatable within holes 17 and 18 in neck blanks 11 and 12, respectively, so that it exactly lines up with the direction of tension in truss rod 20 as tension is applied thereto.

Furthermore, truss rod 20 is entirely embedded in a single piece of wood and the force of truss rod 20 is not aligned with the glue joint between adjacent neck blanks 11 and 12.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A method of assembling a musical instrument neck comprising:

providing first and second elongate, uncarved neck blanks from which a neck is to be carved, each blank having an inner face;

forming an elongate arcuate groove in the inner face of said first neck blank only;

disposing a truss rod in said groove in said first neck blank;

fastening together said inner faces of said first and second neck blanks; and carving the formed assembly to the configuration of a guitar neck and tensioning the truss rod.

2. A method according to claim 1, further comprising:

positioning a straw over said truss rod before inserting said truss rod in said groove in said first neck blank.

3. A method of assembling a musical instrument neck comprising:

providing first and second elongate, uncarved neck blanks from which a neck is to be carved, each blank having an inner face;

forming an elongate arcuate groove in the inner face of said first neck blank only;

forming a first hole in said inner face of said first neck blank, perpendicular to and in alignment with one end of said groove;

forming a second hole in said inner face of said second neck blank;

providing an elongate truss rod;

connecting an anchor pin to one end of said truss rod, perpendicular thereto;

disposing said truss rod in said groove in said first neck blank with said pin extending into said first hole therein;

fastening together said inner faces of said first and second neck blanks with said anchor pin extending into said second hole in said inner face of said second neck blank; and carving the formed assembly to the configuration of a guitar neck.

4. A method according to claim 3, further comprising:

positioniong a straw over said truss rod before inserting said truss rod in said groove in said first neck blank.

* * * * *